3,568,491
LOW-TEMPERATURE STRESS-RELIEVING PROCESS
Ralph C. Bruner and James W. Ramsey, Tulsa, Okla., assignors to North American Rockwell Corporation
Filed May 23, 1969, Ser. No. 827,270
Int. Cl. C22f *1/04;* B21j *1/06*
U.S. Cl. 72—364                                     4 Claims

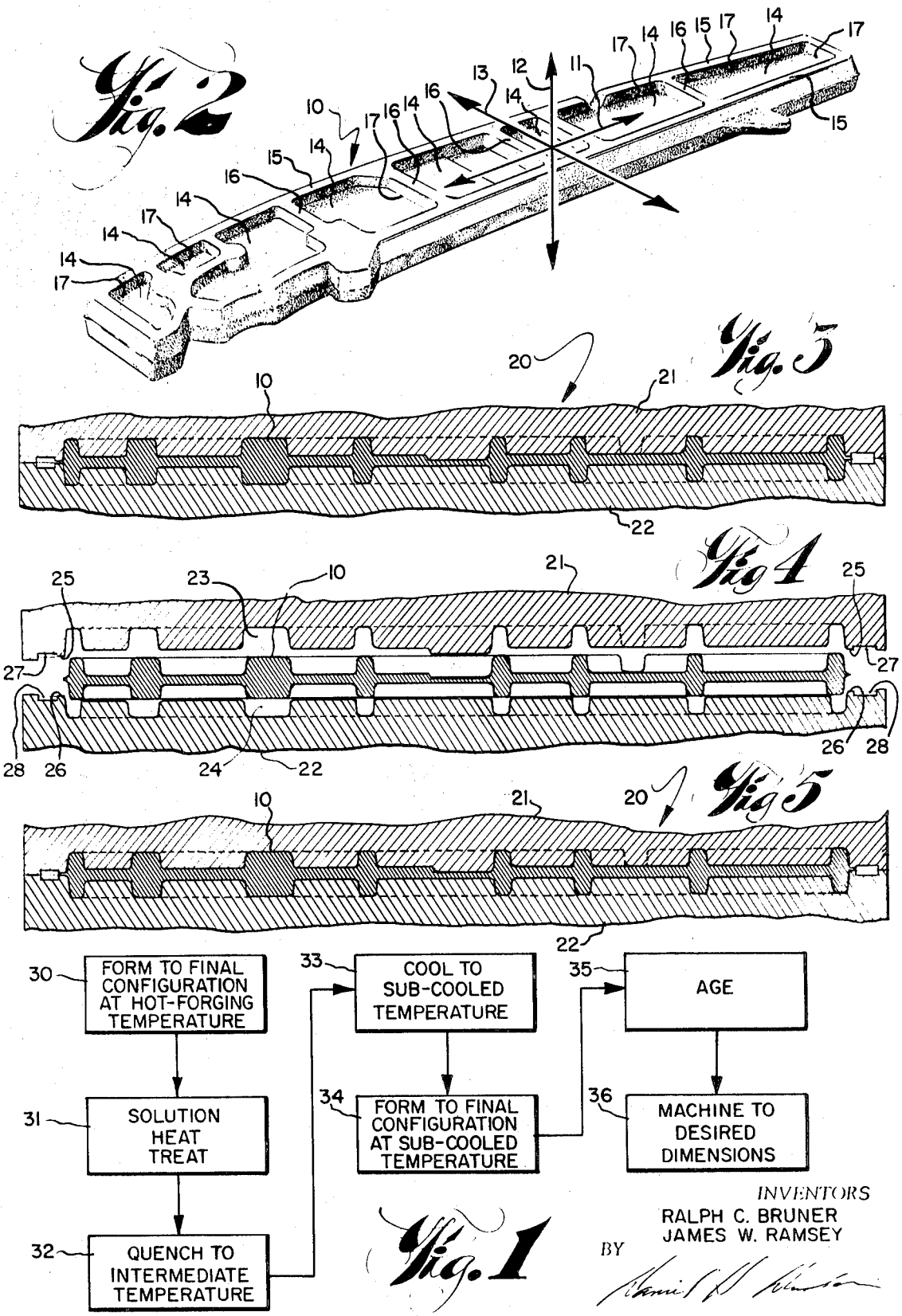

ABSTRACT OF THE DISCLOSURE

A method of manufacturing a stress-relieved aluminum alloy forging using the finish impression cavity of closed die apparatus for both hot-forming and stress-relieving operations and with intermediate processing steps also being involved.

SUMMARY OF THE INVENTION

An aluminum alloy workpiece formed to final configuration at conventional hot-forging temperatures and in conventional opposed-cavity die apparatus is, in sequence: Solution heat-treated at a temperature in the range of 860° F. to 930° F.; rapidly cooled from the solution heat-treating temperature to completely arrest precipitation dispersion as by quenching in water at approximately 155° F.; sub-cooled to a temperature preferably in the range of −90° F. to −110° F. as in an environmentally-controlled low-temperature chamber; formed again to final configuration in the conventional opposed-cavity die apparatus but at the sub-cooled temperature; aged, preferably on an accelerated basis; and finally machined to desired dimensions utilizing conventional machine tools and machining techniques. The reformed and aged aluminum alloy workpiece has reduced residual stress levels in comparison to comparable forgings stress-relieved in conventional manners, thereby minimizing machining problems attributed to substantial warping.

DESCRIPTION OF THE DRAWINGS

FIG. 1 is a flow diagram identifying the principal steps of this invention;

FIG. 2 is a perspective view of an aluminum alloy workpiece formed in accordance with the method of this invention and having representative configuration characteristics;

FIG. 3 is a sectional view of portions of the conventional opposed-cavity die apparatus used in the practice of this invention showing the relationship of such apparatus to an aluminum alloy workpiece during forming to final configuration at a conventional hot-forging temperature; and FIGS. 4 and 5 are sectional views of the die apparatus of FIG. 3 showing the relationship of such apparatus to the workpiece during re-forming of the workpiece to final configuration at the specified sub-cooled temperature in accordance with this invention.

DETAILED DESCRIPTION

In this specification frequent reference will be made to longitudinal, long transverse, and short transverse directions. Although such terms are generally well-understood, they may be better identified with reference to the workpiece 10 configuration shown in FIG. 2. The longitudinal direction is taken parallel to line 11 and generally parallels the major dimension of workpiece 10. Such direction also generally corresponds to the direction of material grain flow lines in the workpiece. The minimum workpiece dimension transverse to the longitudinal direction is identified as being parallel to the short transverse direction. This direction generally corresponds to the direction of line 12 of FIG. 2. The long transverse direction also is transverse to the longitudinal direction but is at right angles to the short transverse direction; such corresponds to the direction of line 13 and generally is parallel to the workpiece width.

Several general remarks may be made with respect to the composite configuration of workpiece 10. As shown in FIG. 2, workpiece 10 is basically comprised of web portions 14 and rib portions 15 and 16. Normally, a fillet 17 is provided at each junction of a web portion and an adjacent rib portion and at each junction of adjacent rib portions. Workpiece 10 in the configuration of the drawings is provided with peripheral rib portions 15 that generally extend around the workpiece perimeter in joined relation. It should be noted that such joined peripheral ribs are not necessarily continuous about the workpiece plan extremes and need not have a uniform depth; such ribs, however, should exist at the longitudinal extremes of the part. In most instances the metal included in web portions 14 and rib portions 15 is subsequently machined substantially over the entire exterior surface to provide required web and flange features in the machined component. Rib portions 16 in workpiece 10 are also utilized in connection with the processing operations of this invention. In many instances such interiorly-located rib portions are an integral part of the component forging designs; in some cases, however, a particular rib portion 16 may be added for processing purposes only and subsequently machined from the part.

General remarks are also appropriate as to the die apparatus 20 that is preferably utilized in the practice of this invention. As shown in FIG. 3, the required apparatus is basically comprised of upper and lower conventional die block members 21 and 22. Such members are designed in a manner which permits their use in conventional forge press equipment of either the mechanical type or the hydraulic type. Such press equipment must necessarily be capable of developing the forces and pressures required for subsequent forging operations. Presses having ratings in the range of 1,500 tons to 50,000 tons have been used in connection with the practice of this invention to date. As shown in the drawings, die block members 21 and 22 are provided with metal-forming cavities 23 and 24, respectively. Such cavities together have shape and dimension characteristics that correspond to the shape and dimension characteristics required of the configuration of the finally-forged workpiece. Accordingly, cavities 23 and 24 are provided with conventional size allowances for subsequent required metal removal, die scuffing, and the like. Each of internal cavities 23 and 24 is normally defined about its periphery by a die flash land 25 or 26. A die flash gutter 27 or 28 surrounds each die flash land 25 and 26 in the conventional manner. Normal forge die draft angles are provided in the rib-forming portions of die cavities 23 and 24 in most instances. Also, die block members 21 and 22 are generally designed for complete closure with approximately .0015″ to .0020″ separation between opposed faces in other than cavity and flash land and gutter regions. Thus, as used herein, complete die closure does not mean establishing intimate contact between members 21 and 22 but refers to the degree of die closure necessary for producing the web thickness desired in the workpiece finally-forged configuration. It also should be noted that members 21 and 22 may be fabricated of state-of-the-art die block materials such as hot-work die steels and the like.

This invention has been utilized in connection with the manufacture of workpieces fabricated of high-strength aluminum alloys. More particularly, such use has involved the forging of workpieces from conventionally-designated 7075 aluminum alloy. Although not presently known, the invention may also have application to other aluminum alloy workpiece materials having generally similar characteristics relative to developing residual stress concentrations.

The principal steps of this invention are identified in blocks 30 through 36 of FIG. 1 of the drawings. For purposes of clarity, the individual operations in the combined sequence are described separately.

As indicated by block 30 of FIG. 1, the initial step in the sequence of operations constituting this invention involves forming a heated aluminum alloy billet of proper size and shape to the final configuration defined by conventional die apparatus 20. This particular step utilizes finish die block members such as 20 and 21 that are normally heated to a temperature in the range of approximately 400° F. to 700° F. The temperature of the required heated aluminum alloy billet, on the other hand, is a conventional hot-forging temperature and is typically in the range of 780° F. to 880° F. It is necessary that a sufficient force be applied to the heated die apparatus and the contained heated billet to work the billet shape to a final configuration wherein the die block members are completely closed.

The formed workpiece is, with or without intermediate cooling to room or ambient temperature, next solution heat-treated as indicated by block 31. Standard heat-treating equipment and procedures are preferred in connection with the operation specified by block 31. Normally, the formed workpiece is heated in a compatible environment having a temperature in the range of 860° F. to 930° F. and is maintained in the environment a sufficient time to attain the elevated temperature completely throughout. The period of time may typically vary from a minimum of 90 minutes to a maximum of 2 hours depending on the type of furnace equipment utilized and the maximum thickness of the forging involved. In the case of 7075 aluminum alloy, a typical aircraft structural forging is heated to temperature of 870° F. ± 10° F. in a conventional salt bath or air furnace to achieve the processing objective.

As specified by block 32, the solution heat-treated aluminum alloy workpiece is next quenched to an intermediate temperature. The cooling is preferably accomplished with the minimum time necessary to achieve a complete arrestment of precipitation dispersion and may involve immersing the workpiece at the solutioning temperature in temperature-controlled water having a temperature in the range of 140° F. to 160° F.

Immediately after the quenching operation is accomplished, and as indicated by block 33, the formed, solution heat-treated, and quenched workpiece is sub-cooled to a temperature sufficient to both retard natural aging and prepare the workpiece in a preferred manner for the subsequent re-forming step. For representative closed die aluminum alloy forgings the sub-cooling temperature range is preferably from —80° F. to —130° F. in typical applications of the instant invention. For 7075 aluminum alloy, by way of example, the best temperature that retards natural aging and meets the objectives of this invention appears to be —100° F., with a tolerance of plus or minus 10° F. Such sub-cooling may be accomplished in a conventional environmentally-controlled temperature chamber.

While the part is essentially at the temperature achieved in connection with the processing step of block 33, a re-forming operation involving the workpiece is accomplished as indicated by block 34. Such is accomplished using the same die apparatus employed in connection with the processing of block 30 except that the apparatus is preferably at room or ambient temperature rather than at an elevated or hot-forging temperature. As in the case of step 30, the sub-cooled aluminum alloy workpiece is compressed by a sufficient force that accomplishes complete die closure. As shown by FIG. 4, the sub-cooled aluminum alloy workpiece only nominally contacts the cavity surfaces of die blocks 21 and 22 prior to the re-forming action. This condition exists because of different thermal expansion/contraction coefficients and different degrees of total shrinkage as between the initially-formed workpiece and the die apparatus. As the surfaces of cavities 23 and 24 in die blocks 21 and 22 are brought into engagement with ribs 15 and 16 of workpiece 10, various elongations occur with respect to the metal located in web regions 14. Normally, initial die contact occurs with respect to peripheral ribs 15 and thus, stretching is likely to occur first in thinner web sections and in the longitudinal and long transverse sections most distant from the workpiece center region. As the die blocks are additionally advanced toward each other from die block-workpiece initial contact, stretching is in turn imparted to more centrally-located web regions. Interiorly-located transverse ribs 16 often additionally function to limit the degree of elongation imparted to particular web regions and are desirably located at regions of substantial web thickness change. It is desirable, in fact, to provide a substantial transverse rib 16 in the central region of the forging workpiece for locating and reference purposes.

After re-forming, the aluminum alloy workpiece may be machined with or without a preceding conventional accelerated aging step 35. The usual procedure, however, is to accelerate age prior to machining. Machining to desired dimensions, block 36 of FIG. 1, is accomplished by conventional machining practices and at a reduced level in comparison to the machining of conventional aircraft-quality stress-relieved forgings. Normally, only final cuts are required to finish the workpiece for the reason that serious warpage due to residual stress is not present in parts processed in accordance with this invention.

It is to be understood that the forms of the invention herewith shown and described are to be taken as preferred embodiments of the same, but that various changing in the proportioning, size, and detail of parts and apparatus and in processing times and temperatures may be resorted to without departing from the spirit of the invention or the scope of the subjoined claims.

What is claimed is:

1. In a method of forming an aluminum alloy workpiece to a final configuration comprised of at least one web region of prescribed depth and rib regions of significantly greater depth adjoining said web region, the combined steps of:
  (a) Forming a workpiece to a configuration corresponding to said final configuration by forging an aluminum alloy at a temperature in the range of approximately 780° F. to 880° F. in opposed upper and lower die members that define an internal cavity corresponding to said final configuration when completely closed and that are maintained at a temperature in the range of approximately 400° F. to 700° F.
  (b) Heat-treating said formed workpiece at an elevated temperature in the range of approximately 860° F. to 930° F. after removal from said die members for sufficient time to accomplish alloy solutioning and homogenization,
  (c) Cooling said heat-treated workpiece from said heat-treating elevated temperature to a sub-cooled temperature substantially below ambient temperature and with an arrested precipitation dispersion, and
  (d) Forming said cooled workpiece to said final configuration by forging at said sub-cooled temperature in said die members at ambient temperature.

2. The invention defined by claim 1, wherein said sub-cooled temperature is in the range of —90° F. to —110° F.

3. The invention defined by claim 1, wherein said cooling is accomplished by quenching said heat-treated workpiece from said heat-treating elevated temperature to a near-ambient temperature that is below an accelerated aging temperature of the aluminum alloy and by immediately afterwards cooling said heat-treated workpiece from said near-ambient temperature to said sub-cooled temperature.

4. The invention defined by claim 3, wherein said near-ambient temperature is in the range of 140° F. to 160° F. and wherein said sub-cooled temperature is in the range of −90° F. to −110° F.

References Cited

UNITED STATES PATENTS

| | | | |
|---|---|---|---|
| 3,185,600 | 5/1965 | Dullberg | 148—125 |
| 3,392,568 | 7/1968 | Garrity | 148—11.5 |

LOWELL A. LARSON, Primary Examiner

U.S. Cl. X.R.

72—700; 148—11.5, 125